United States Patent
Clark et al.

(10) Patent No.: US 10,128,622 B1
(45) Date of Patent: Nov. 13, 2018

(54) ELECTRICAL SYSTEM, AND POWER INLET APPARATUS AND ELECTRICAL RECEPTACLE ASSEMBLY THEREFOR

(71) Applicant: EATON CORPORATION, Cleveland, OH (US)

(72) Inventors: John Thomas Clark, Beaver, PA (US); Andrew William Courson, McGrann, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/581,759

(22) Filed: Apr. 28, 2017

(51) Int. Cl.
| | |
|---|---|
| H01R 3/00 | (2006.01) |
| H02G 3/14 | (2006.01) |
| H05K 5/03 | (2006.01) |
| H01R 13/717 | (2006.01) |
| H01R 13/73 | (2006.01) |
| H01R 24/30 | (2011.01) |
| H01R 13/447 | (2006.01) |
| H02J 9/06 | (2006.01) |
| H01R 105/00 | (2006.01) |

(52) U.S. Cl.
CPC ....... H01R 13/7175 (2013.01); H01R 13/447 (2013.01); H01R 13/7172 (2013.01); H01R 13/73 (2013.01); H01R 24/30 (2013.01); H02J 9/061 (2013.01); H01R 2105/00 (2013.01); H02J 2009/068 (2013.01)

(58) Field of Classification Search
CPC .......................... H01R 13/717; H01R 13/7175
USPC .................... 439/490, 488, 274; 174/67
See application file for complete search history.

(56) References Cited

U.S. PATENT DOCUMENTS

| | | | | |
|---|---|---|---|---|
| 3,924,914 | A * | 12/1975 | Banner | G01R 19/14 340/641 |
| 4,797,116 | A * | 1/1989 | Isohata | H01R 13/506 439/141 |
| 5,984,719 | A | 11/1999 | Flegel | |
| 6,564,427 | B1 | 5/2003 | Flegel | |
| 6,674,031 | B1 | 1/2004 | Flegel | |
| 7,168,974 | B2 * | 1/2007 | Feldman | H01R 13/6658 439/488 |
| 7,766,695 | B1 | 8/2010 | Czarnecki et al. | |
| 8,963,731 | B1 * | 2/2015 | Miller | G04C 23/04 307/131 |
| 9,048,040 | B1 * | 6/2015 | Miller | G04C 23/04 |
| 9,762,056 | B1 * | 9/2017 | Miller | H02J 3/00 |
| 2005/0037661 | A1 * | 2/2005 | Tanacan | H01R 13/6691 439/488 |
| 2009/0084572 | A1 * | 4/2009 | Smith | H01R 13/5213 174/67 |

(Continued)

*Primary Examiner* — Abdullah Riyami
*Assistant Examiner* — Thang Nguyen
(74) *Attorney, Agent, or Firm* — Eckert Seamans

(57) ABSTRACT

An electrical receptacle assembly is for a power inlet apparatus of an electrical system. The power inlet apparatus includes a housing. The electrical system has a power source and a transfer switch. The electrical receptacle assembly includes an electrical receptacle structured to be mechanically coupled to the housing and electrically connected with the power source and the transfer switch, and an indication assembly mechanically coupled to and electrically connected with the electrical receptacle. The indication assembly has a status indicator adapted to provide an indication of circuit status within the electrical system.

16 Claims, 6 Drawing Sheets

(56) References Cited

U.S. PATENT DOCUMENTS

| | | | | |
|---|---|---|---|---|
| 2014/0045366 A1* | 2/2014 | O'Rourke | ............... | H01R 31/02 |
| | | | | 439/488 |
| 2015/0031235 A1* | 1/2015 | Wiesemann | .......... | B60L 3/0069 |
| | | | | 439/488 |
| 2015/0364873 A1* | 12/2015 | Zien | ..................... | H01R 13/514 |
| | | | | 439/490 |
| 2017/0317494 A1* | 11/2017 | Chapel | ................ | H02J 13/0082 |

* cited by examiner

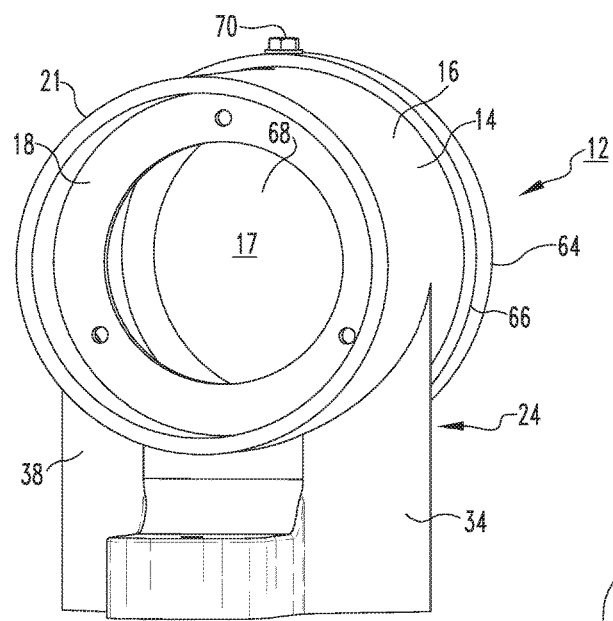
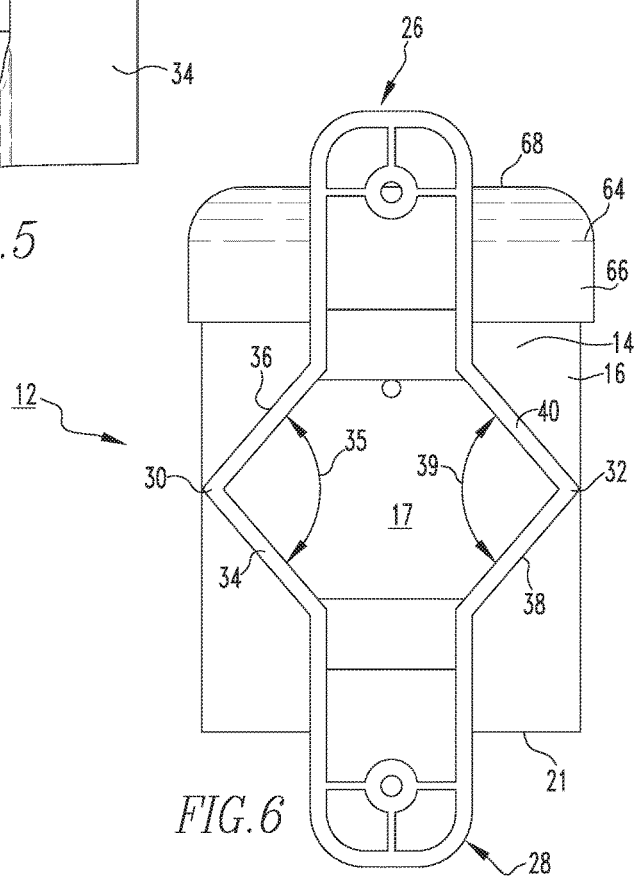
FIG.5
FIG.6

ELECTRICAL SYSTEM, AND POWER INLET APPARATUS AND ELECTRICAL RECEPTACLE ASSEMBLY THEREFOR

BACKGROUND

Field

The disclosed concept relates generally to electrical systems, such as, for example, electrical systems including generators. The disclosed concept further relates to power inlet apparatus for electrical systems. The disclosed concept further relates to electrical receptacle assemblies for power inlet apparatus.

Background Information

Electrical systems commonly include power inlet apparatus for providing an electrical pathway between a power source, such as a generator, and a transfer switch located inside a building, such as a residence. Power inlet apparatus, which include electrical receptacles, are typically mounted to the exterior of the building and provide an inlet for the supply of electrical power from the generator. The generator transfer switch is typically connected to the main electrical panel or load center of the building. The electrical receptacle of the power inlet apparatus is connected with a cord from the generator for providing power from the generator through the power inlet apparatus to the generator transfer switch, and ultimately to the main electrical panel in order to supply power to certain circuits of the building in the event of a power outage or the like.

A known problem with conventional power inlet apparatus is that operators are unable to quickly determine whether power is being delivered to the building by the generator. More specifically, when the operator plugs the power cord of the generator into the receptacle of the power inlet box in the event of a utility power outage, the operator must then go into the building and check whether power is being delivered to the building. Furthermore, enclosures or housings of known power inlet apparatus typically include numerous components, thereby making assembly relatively expensive and time consuming. Additionally, housings of known power inlet apparatus typically require separate mounting components, such as wall plates, in order to be secured to the exterior of a building.

There is thus room for improvement in electrical systems, and in power inlet apparatus and electrical receptacle assemblies therefor.

SUMMARY

These needs and others are met by embodiments of the disclosed concept, which are directed to an improved electrical system, and power inlet apparatus and electrical receptacle assembly therefor, which among other benefits saves operators time by providing a visual indication of circuit status within the electrical system.

In accordance with one aspect of the disclosed concept, an electrical receptacle assembly is provided for a power inlet apparatus of an electrical system. The power inlet apparatus includes a housing. The electrical system has a power source and a transfer switch. The electrical receptacle assembly includes an electrical receptacle structured to be mechanically coupled to the housing and electrically connected with the power source and the transfer switch, and an indication assembly mechanically coupled to and electrically connected with the electrical receptacle. The indication assembly has a status indicator adapted to provide an indication of circuit status within the electrical system.

In accordance with another aspect of the disclosed concept, a power inlet apparatus including a housing and the aforementioned electrical receptacle assembly is provided.

In accordance with another aspect of the disclosed concept, an electrical system including a power source, a transfer switch, and the aforementioned power inlet apparatus is provided.

BRIEF DESCRIPTION OF THE DRAWINGS

A full understanding of the disclosed concept can be gained from the following description of the preferred embodiments when read in conjunction with the accompanying drawings in which:

FIG. 5 is a bottom isometric view of a housing for the power inlet apparatus of FIG. 4 with interior portions of the electrical receptacle assembly having been removed;

FIG. 6 is a back elevational view of the housing of FIG. 5;

DESCRIPTION OF THE PREFERRED EMBODIMENTS

Figure 1:
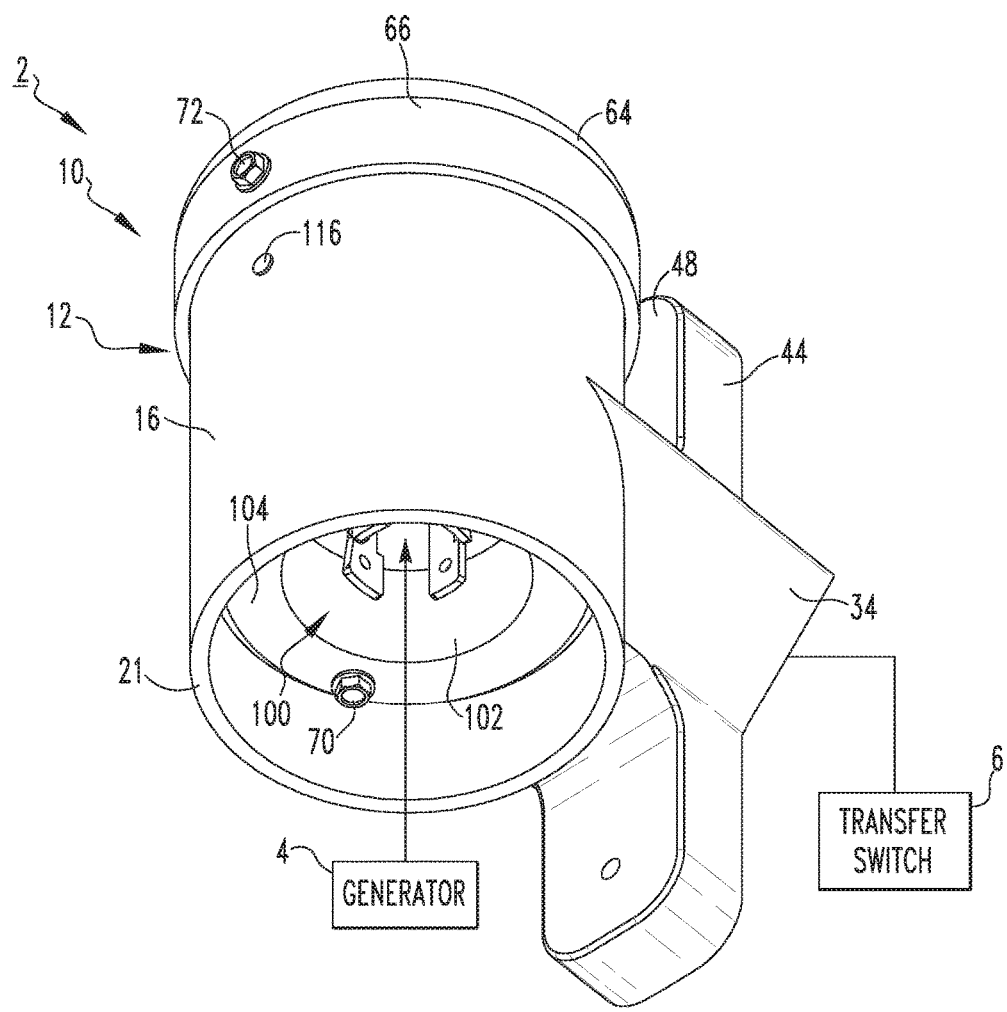
FIG. 1 is a partially simplified view of an electrical system, and power inlet apparatus and electrical receptacle assembly therefor, in accordance with one non-limiting embodiment of the disclosed concept.

For purposes of the description hereinafter, directional phrases used herein such as, for example "left", "right", "up", "down", "top", "bottom", and derivatives thereof shall relate to the disclosed concept, as it is oriented in the drawings. It is to be understood that the specific elements illustrated in the drawings and described in the following specification are simply exemplary embodiments of the disclosed concept. Therefore, specific orientations and other physical characteristics related to the embodiments disclosed herein are not to be considered limiting with respect to the scope of the disclosed concept.

As employed herein, the statement that two or more parts are "coupled" or "connected" together shall mean that the parts are joined together either directly or joined through one or more intermediate parts.

As employed herein, the term "number" shall mean one or an integer greater than one (i.e., a plurality).

As employed herein, the statement that two or more parts or components "engage" one another shall mean that the parts exert a force against one another either directly or through one or more intermediate parts or components.

As employed herein, the term "coupling member" refers to any suitable connecting or tightening mechanism expressly including, but not limited to, zip ties, wire ties, rivets, screws, bolts, the combination of bolts and nuts (e.g., without limitation, lock nuts), and washers and nuts.

FIG. 1 shows an electrical system 2, in accordance with one non-limiting embodiment of the disclosed concept. The example electrical system 2 includes a power source (e.g., without limitation, generator 4, shown in simplified form), a transfer switch 6 (shown in simplified form), and a novel power inlet apparatus 10. The power inlet apparatus 10 is structured to be coupled to the exterior of a building such as, for example and without limitation, a residence. The power inlet apparatus 10 includes a housing 12 and an electrical receptacle assembly 100 having an electrical receptacle 102 coupled to the housing 12. The electrical receptacle 102 is electrically connected with the transfer switch 6, which is structured to be positioned within the building. The transfer switch 6 is also electrically connected with a utility power feed (not shown) of the building. In the event of a utility power outage, an operator can connect the generator 4 to the electrical receptacle 102 in order to supply emergency power to the utility power feed of the building via the transfer switch 6. In accordance with the disclosed concept, and as will be discussed below, the power inlet apparatus 10 provides a novel mechanism for the operator to determine circuit status within the electrical system 2. Furthermore, the power inlet apparatus 10 is less expensive to manufacture, as compared with prior art power inlet apparatus (not shown), and is relatively easy to mount to a building.

Figure 2:
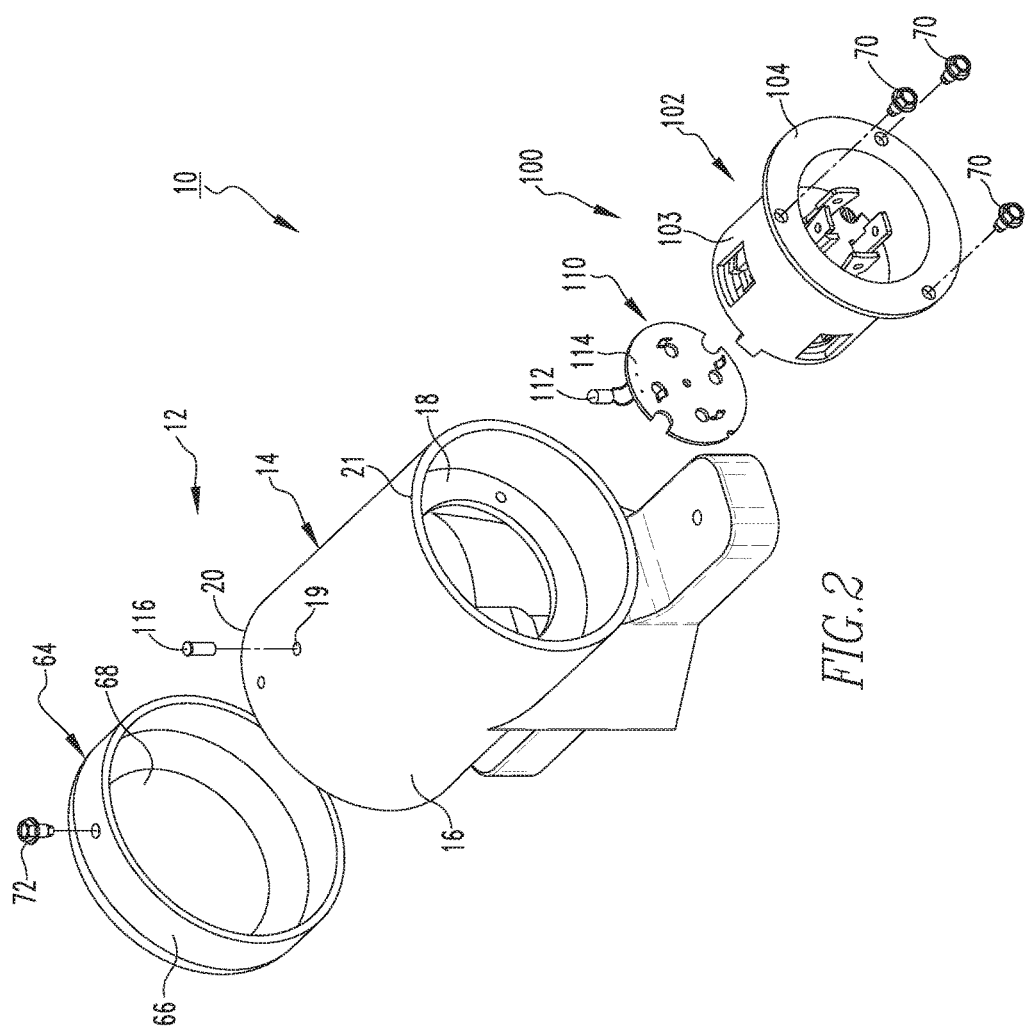
FIG. 2 is an exploded front isometric view of the power inlet apparatus and electrical receptacle assembly therefor of FIG. 1.
Figure 3:
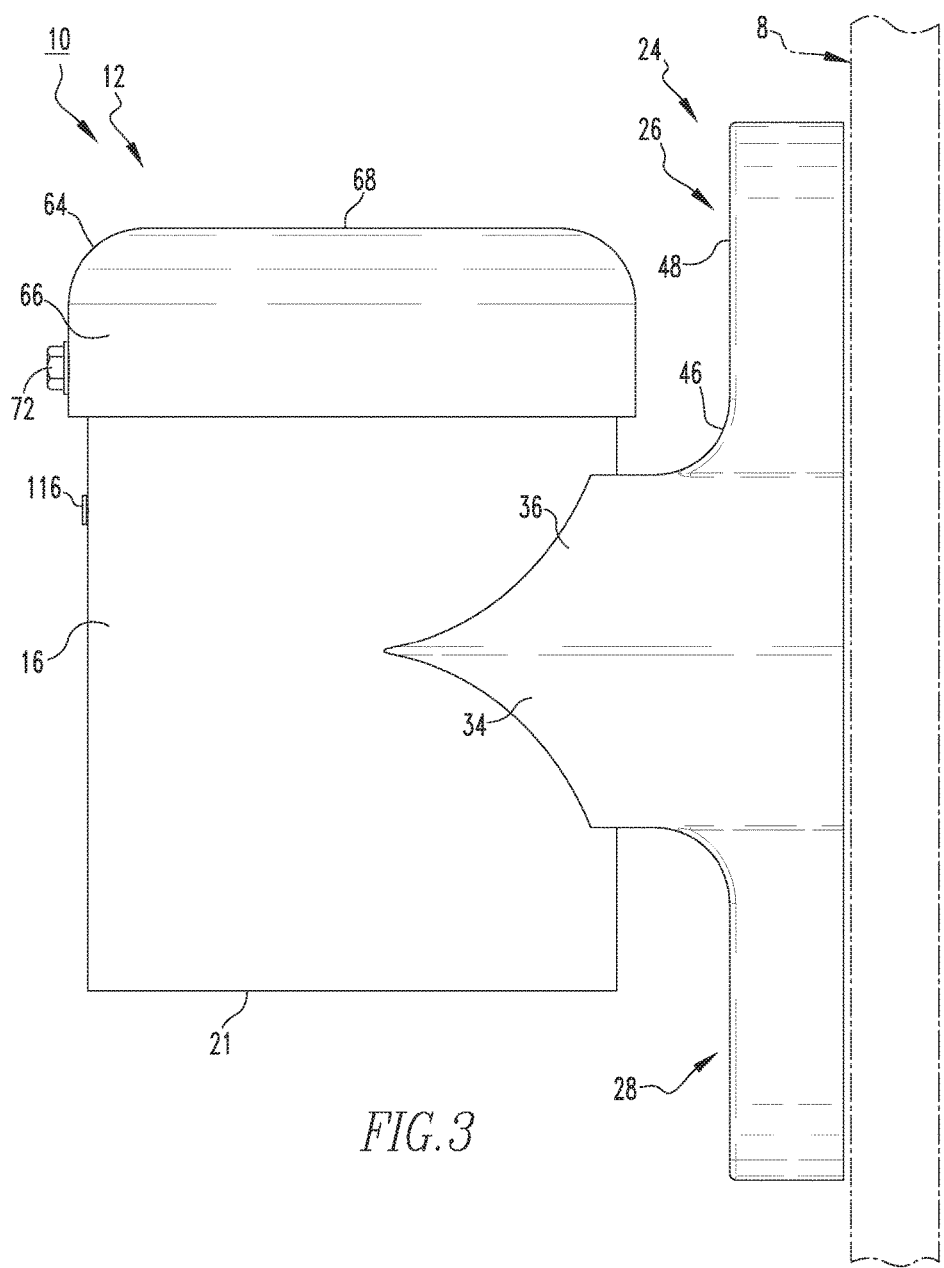
FIG. 3 is a side elevational view of the power inlet apparatus and electrical receptacle assembly therefor of FIG. 2, shown with a mounting member in simplified form.
Figure 4:
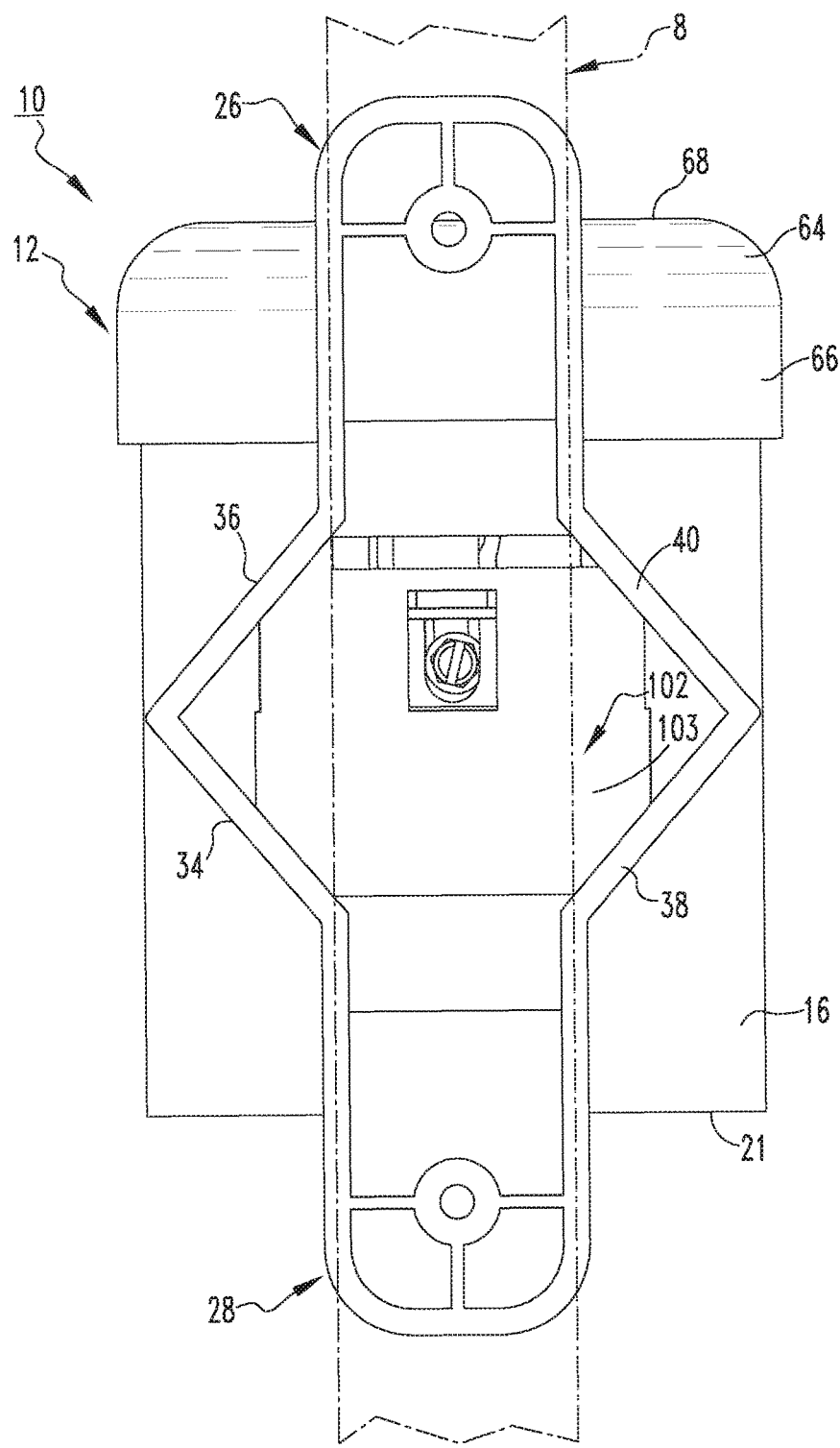
FIG. 4 is a back elevational view of the power inlet apparatus and electrical receptacle assembly therefor of FIG. 3, shown with the mounting member.

FIGS. 2-4 show different views of the power inlet apparatus 10, in accordance with one non-limiting example embodiment of the disclosed concept. As shown in FIG. 2, the electrical receptacle assembly 100 further includes an indication assembly 110 having a status indicator (e.g., without limitation, light emitting diode (LED) 112), a printed circuit board 114 coupled to and electrically connected with the light emitting diode 112, and a light pipe 116 structured to engage the light emitting diode 112. The printed circuit board 114 is mechanically coupled to and electrically connected with terminals of the electrical receptacle 102. It will be appreciated that the light emitting diode 112 is adapted to provide an indication of circuit status within the electrical system 2 (FIG. 1). In one example embodiment, the light emitting diode 112 has an ON condition (i.e., illuminated) corresponding to an electrical connection between the generator 4 (FIG. 1) and the transfer switch 6 (FIG. 1), and an OFF condition (i.e., non-illuminated) corresponding to electrical disconnection between the generator 4 (FIG. 1) and the transfer switch 6 (FIG. 1).

Continuing to refer to FIG. 2, the housing 12 includes a housing member 14 preferably having a cylindrical-shaped body portion 16 and an annular-shaped flange portion 18 extending radially inwardly from the body portion 16. In the example shown and described herein, the body portion 16 has a thru hole 19 and the light pipe 116 extends at least partially into the thru hole 19 in order to transmit light from the light emitting diode 112 to an exterior of the housing member 14. In one example embodiment, the light pipe 116 extends from an interior of the housing member 14 entirely through the thru hole 19 to an exterior thereof. Accordingly, when the operator connects the generator 4 (FIG. 1) to the electrical receptacle 102 in the event of a utility power outage, the operator will be able to readily determine whether power is being supplied to the transfer switch 6 (FIG. 1) by viewing the light pipe 116 and thus observing the condition (i.e., ON or OFF) of the light emitting diode 112. This saves time in that the operator no longer has to physically enter the building to determine whether power is being supplied by the power source.

Furthermore, the electrical receptacle 102 includes a wall portion 103 and an annular-shaped flange portion 104 extending radially outwardly from the wall portion 103. The flange portion 104 of the electrical receptacle 102 substantially overlays the flange portion 18 of the housing member 14, and as shown, the power inlet apparatus 10 further includes a number of coupling members 70 that couple the flange portions 18,104 together in order to reliably maintain the electrical receptacle 102 within the housing 12.

As shown in FIGS. 2-4, the housing 12 further includes a cap member 64 having a cylindrical-shaped coupling portion 66 and a generally planar top portion 68 extending from and being located internal with respect to the coupling portion 66. The body portion 16 of the housing member 14 has a first end portion 20 (FIG. 2) and a second end portion 21 located opposite and distal the first end portion 20. As shown, the first end portion 20 of the body portion 16 is located internal with respect to the coupling portion 66 of the cap member 64, and the power inlet apparatus 10 further includes another coupling member 72 for coupling the first end portion 20 to the coupling portion 66. In this manner, the electrical receptacle 102 is partially enclosed by the housing member 14 and the cap member 64. The housing 12 thus generally comprises two components (i.e., the housing member 14 and the cap member 64) that are each preferably injection molded components, and are coupled together. As such, the housing 12 is relatively inexpensive and generally requires a simple and easy assembly step of coupling the housing member 14 to the cap member 64. Prior art housings (not shown) for power inlet apparatus, by way of contrast, generally require significantly more components, and as such require more time consuming, expensive, and burdensome methods of assembly. It will also be appreciated that the housing member 14 and the cap member 64 (i.e., the housing 12) cooperatively provide a weather proof enclosure for the electrical receptacle 102 when the electrical receptacle is mounted in the correct position, or, facing down toward the ground (see, for example, the orientation of FIG. 1).

FIGS. 5 and 6 show different views of the housing 12. As shown, the housing member 14 further includes a mounting portion 24 extending from the body portion 16. The mounting portion 24 defines a passage between an exterior of the housing member 14 and an interior 17 of the body portion 16, which houses the electrical receptacle 102. As will be discussed below, electrical wires (not shown) are provided with a pathway from the electrical receptacle 102 into the interior of a building via the mounting portion 24.

The mounting portion 24 includes a first alignment portion 26, a second alignment portion 28 opposite the first alignment portion 26, a first middle portion 30 extending from the first alignment portion 26 to the second alignment portion 28, and a second middle portion 32 extending from the first alignment portion 26 to the second alignment portion 28. In one example embodiment, the middle portions 30,32 each include a corresponding first substantially planar wall 34,38 and a corresponding second substantially planar wall 36,40 extending from the corresponding first wall 34,38. In one example embodiment, the first walls 34,38 are preferably located at corresponding angles 35,39 of between 75 degrees and 125 degrees with respect to the second walls 36,40. Furthermore, the walls 34,36,38,40 each extend from the body portion 16 of the housing member 14. Accordingly, as shown in FIG. 6, the first middle portion 30 is concave facing the second middle portion 32, and the second middle portion 32 is concave facing the first middle portion 30.

Figure 7:
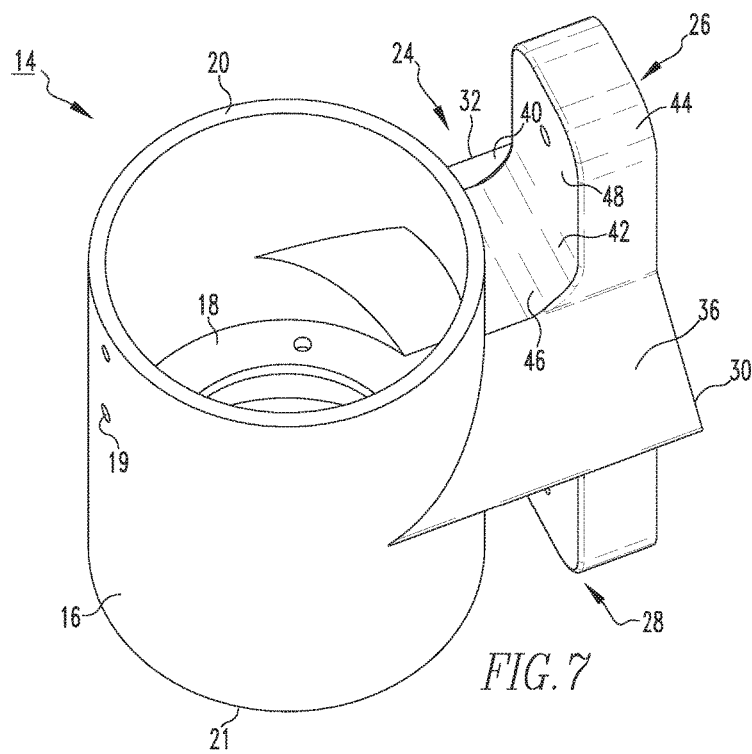
FIG. 7 is a top isometric view of a housing member for the housing of FIG. 6.

FIG. 7 shows an isometric view of the housing member 14. It will be appreciated that the first alignment portion 26 is structured substantially the same as the second alignment portion 28. However, for economy of disclosure, only the first alignment portion 26 will be discussed in greater detail. As shown, the first alignment portion 26 includes a first wall 42 and a generally C-shaped second wall 44 extending from the first wall 42. The first wall 42 includes a curved portion 46 extending from the body portion 16 of the housing member 14, and a generally planar portion 48 extending from the curved portion 46. It will be appreciated that the second wall 44 extends from and is located generally perpendicular to the planar portion 48.

Accordingly, the structure of the alignment portions 26,28 and the middle portions 30,32 allow the power inlet apparatus 10 to be coupled to an existing structure of a building, and allow electrical wires (not shown) to have a pathway from the electrical receptacle 102 into the interior of the building. More specifically, and with reference again to FIGS. 3 and 4, the first and second alignment portions 26,28 advantageously allow the power inlet apparatus 10 to be coupled to, for example and without limitation, an elongated mounting member (e.g., without limitation, wooden post 8, shown in simplified form) of a building. That is, rather than requiring a separate mounting member such as a plate (not shown) to be coupled to the building, the alignment portions 26,28 advantageously utilize existing post structures of buildings in order to be mounted thereto.

Furthermore, as shown in FIG. 4, there is provided a pathway from the electrical receptacle 102 to an exterior of the housing 12 via the opening defined by the left side of the post 8 and the walls 34,36, and via the opening defined by the right side of the post 8 and the walls 38,40. Thus, by virtue of the middle portions 30,32 extending outwardly from the alignment portions 26,28 and being concave with respect to each other, electrical wires (not shown) can be fed through either of the aforementioned openings while the power inlet apparatus 10 is coupled to the post 8. It will be appreciated that while the middle portions 30,32 in FIG. 6 include generally planar walls 34,36,38,40, it is within the scope of the disclosed concept for similar suitable alternative middle portions (not shown) to each be one continuous curved portion, without departing from the scope of the disclosed concept.

EXAMPLE

Figure 8:
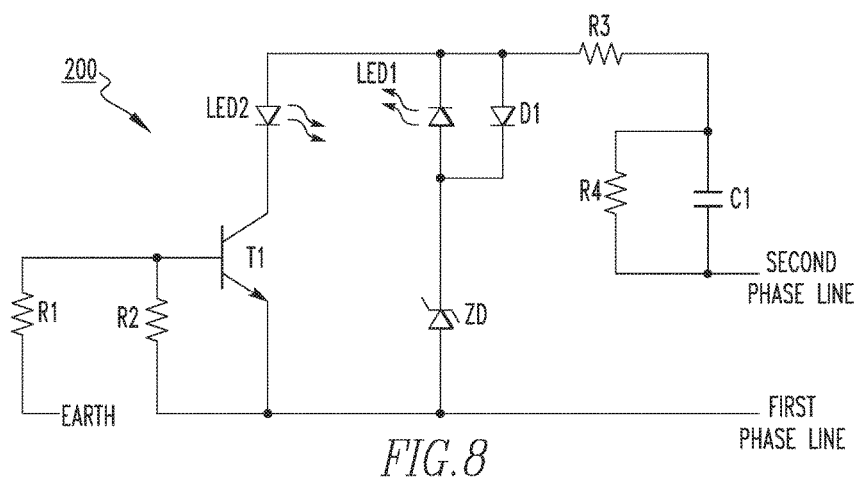
FIG. 8 is a non-limiting example of a circuit schematic for an electrical system, and power inlet apparatus and electrical receptacle assembly therefor, in accordance with a non-limiting example embodiment of the disclosed concept.

FIG. 8 shows an example circuit schematic 200 for an electrical system, in accordance with one non-limiting embodiment of the disclosed concept. As shown, the example circuit 200 includes a number of resistors R1,R2,R3,R4, a transistor T1, a zener diode ZD, a diode D1, a capacitor C1, and a number of status indicators (e.g., without limitation, light emitting diodes LED1,LED2) each having an ON condition (i.e., illuminated) and an OFF condition (i.e., non-illuminated). Resistor R1 has a first end connected to an Earth line and a second end connected to R2 and the gate of T1. R2 has a first end connected to the gate of T1 and a second end connected to the emitter of T1, the anode end of ZD, and a First Phase line. T1 has a collector connected to the cathode end of LED2 and an emitter connected to the anode end of ZD and the First Phase line. LED1 is electrically connected in parallel with D1. The cathode end of ZD is connected with the parallel combination of LED1 and D1. The anode end of ZD is connected with the emitter of T1 and the First Phase line. The cathode end of LED2 is connected with the collector of T1, and the anode end of LED2 is connected with the parallel combination of LED1 and D1. R4 and C1 are connected in parallel. The parallel combination of R4 and C1 has a first end connected to a Second Phase line and a second end connected to R3. R3 has a first end connected to the parallel combination of LED1 and D1, and a second end connected to the parallel combination of R4 and C1.

It will be appreciated that the example circuit 200 has a first circuit status, a second circuit status, and a third circuit status. The first circuit status corresponds to all of the First Phase line, the Second Phase line, and the Earth line being unbroken. The second circuit status corresponds to at least one of the First Phase line and the Second Phase line being broken. The third circuit status corresponds to both the First Phase line and the Second Phase line being unbroken, and the Earth line being broken. The first circuit status corresponds to LED1,LED2 both being in the ON condition. The second circuit status corresponds to LED1,LED2 both being in the OFF condition. The third circuit status corresponds to LED1 being in the ON condition and LED2 being in the OFF condition.

Accordingly, it will be appreciated that disclosed concept provides for an improved (e.g., without limitation, improved ability to determine circuit status within an electrical system 2, easier to manufacture and assemble housing 12, and easier and less expensive to mount to a building) electrical system 2, and power inlet apparatus 10 and electrical receptacle assembly 100 therefor.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A power inlet apparatus for an electrical system, said electrical system comprising a power source, said power inlet apparatus comprising:
   a housing; and
   an electrical receptacle assembly comprising:
      an electrical receptacle mechanically coupled to said housing and structured to be electrically connected with said power source, and
      an indication assembly mechanically coupled to and electrically connected with said electrical receptacle, said indication assembly comprising a status indicator adapted to provide an indication of circuit status within said electrical system,
   wherein said housing comprises a housing member and a cap member; wherein said housing member comprises a body portion having a first end portion and a second end portion disposed opposite and distal the first end portion; wherein said cap member is coupled to the first end portion in order to partially enclose said electrical receptacle; wherein said body portion is cylindrical-shaped; wherein said cap member comprises a cylindrical-shaped coupling portion and a top portion extending from the coupling portion; and wherein the first end portion of the body portion is coupled to and is disposed internal with respect to the coupling portion of said cap member.

2. A power inlet apparatus for an electrical system, said electrical system comprising a power source, said power inlet apparatus comprising:
   a housing; and
   an electrical receptacle assembly comprising:
      an electrical receptacle mechanically coupled to said housing and structured to be electrically connected with said power source, and
      an indication assembly mechanically coupled to and electrically connected with said electrical receptacle, said indication assembly comprising a status indicator adapted to provide an indication of circuit status within said electrical system,
   wherein said housing comprises a housing member having a body portion and a mounting portion extending from the body portion; wherein the body portion has an interior; and wherein the mounting portion defines a passage between an exterior of said housing member and the interior.

3. The power inlet apparatus of claim 2 wherein said circuit status includes a first circuit status, a second circuit status, and a third circuit status; wherein said first circuit status corresponds to all of a First Phase line, a Second Phase line, and an Earth line being unbroken; wherein said second circuit status corresponds to at least one of said First Phase line and said Second Phase line being broken; and wherein said third circuit status corresponds to said First Phase line being unbroken, said Second Phase line being unbroken, and said Earth line being broken.

4. The power inlet apparatus of claim 3 wherein said status indicator comprises a first light emitting diode and a second light emitting diode each having an ON condition and an OFF condition; wherein said first circuit status corresponds to both said first light emitting diode and said second light emitting diode being in the ON condition; wherein said second circuit status corresponds to both said first light emitting diode and said second light emitting diode being in the OFF condition; and wherein said third circuit status corresponds to said first light emitting diode being in the ON condition and said second light emitting diode being in the OFF condition.

5. The power inlet apparatus of claim 2 wherein said indication assembly further comprises a printed circuit board coupled to said status indicator and said electrical receptacle.

6. The power inlet apparatus of claim 5 wherein said status indicator comprises a light emitting diode coupled to said printed circuit board.

7. The power inlet apparatus of claim 6 wherein said indication assembly further comprises a light pipe engaging said light emitting diode.

8. The power inlet apparatus of claim 2 wherein said housing member further has a flange portion extending inwardly from said body portion; wherein said electrical receptacle comprises a wall portion and a flange portion extending outwardly from said wall portion; and wherein the flange portion of said electrical receptacle is coupled to the flange portion of said housing member in order to maintain said electrical receptacle on said housing member.

9. The power inlet apparatus of claim 8 wherein the flange portion of said electrical receptacle and the flange portion of said housing member are each annular-shaped; and wherein the flange portion of said electrical receptacle substantially overlays the flange portion of said housing member.

10. The power inlet apparatus of claim 2 wherein the mounting portion comprises a first alignment portion, a second alignment portion opposite the first alignment portion, a first middle portion extending from the first alignment portion to the second alignment portion, and a second middle portion extending from the first alignment portion to the second alignment portion; wherein the first middle portion is concave facing the second middle portion; and wherein the second middle portion is concave facing the first middle portion.

11. The power inlet apparatus of claim 10 wherein at least one of the first middle portion and the second middle portion comprises a first wall and a second wall each extending from the body portion; wherein the first wall extends from the second wall; and wherein the first wall and the second wall are each substantially planar.

12. The power inlet apparatus of claim 11 where the first wall is disposed at an angle of between 75 degrees and 125 degrees with respect to the second wall.

13. The power inlet apparatus of claim 10 wherein at least one of the first alignment portion and the second alignment portion comprises a first wall and a second wall extending from the first wall; wherein the first wall comprises a curved portion and a planar portion extending from the curved portion; wherein the curved portion extends from the body portion; and wherein the second wall extends from and is disposed generally perpendicular to the planar portion.

14. The power inlet apparatus of claim 2 wherein said body portion has a thru hole; wherein said status indicator comprises a light emitting diode; and wherein said indication assembly further comprises a light pipe engaging said light emitting diode and extending at least partially into the thru hole in order to transmit light from said light emitting diode to an exterior of said housing member.

15. An electrical system comprising:
   a power source; and
   a power inlet apparatus comprising:
      a housing, and
      an electrical receptacle assembly comprising:
         an electrical receptacle mechanically coupled to said housing and electrically connected with said power source, and
         an indication assembly mechanically coupled to and electrically connected with said electrical receptacle, said indication assembly comprising a status indicator adapted to provide an indication of circuit status within said electrical system,
      wherein said housing comprises a housing member having a body portion and a mounting portion extending from the body portion; wherein the body portion has an interior; and wherein the mounting portion defines a passage between an exterior of said housing member and the interior.

16. The electrical system of claim 15 wherein said circuit status includes a first circuit status, a second circuit status, and a third circuit status; wherein said first circuit status corresponds to all of a First Phase line, a Second Phase line, and an Earth line being unbroken; wherein said second circuit status corresponds to at least one of said First Phase line and said Second Phase line being broken; and wherein said third circuit status corresponds to said First Phase line being unbroken, said Second Phase line being unbroken, and said Earth line being broken.

* * * * *